United States Patent
Bhat et al.

(10) Patent No.: US 8,422,563 B2
(45) Date of Patent: Apr. 16, 2013

(54) SYSTEM FOR GENERATING CLOSED CAPTIONING COMPATIBLE WITH LEGACY AND NEWER SET-TOP BOXES

(75) Inventors: Dinkar N. Bhat, Princeton, NJ (US); Albert F. Elcock, West Chester, PA (US)

(73) Assignee: General Instrument Corporation, Horsham, PA (US)

( * ) Notice: Subject to any disclaimer, the term of this patent is extended or adjusted under 35 U.S.C. 154(b) by 622 days.

(21) Appl. No.: 12/624,720

(22) Filed: Nov. 24, 2009

(65) Prior Publication Data
US 2011/0122314 A1   May 26, 2011

(51) Int. Cl.
*H04N 7/12* (2006.01)
(52) U.S. Cl.
USPC .................................................. 375/240.26
(58) Field of Classification Search .............. 375/240.26
See application file for complete search history.

(56) References Cited

U.S. PATENT DOCUMENTS

| 6,373,526 | B1 | 4/2002 | Kessler et al. |
| 2002/0122136 | A1 | 9/2002 | Safadi et al. |
| 2006/0158551 | A1 | 7/2006 | Kim |
| 2007/0076122 | A1 | 4/2007 | Modi et al. |
| 2007/0136777 | A1* | 6/2007 | Hasek et al. ........... 725/114 |

* cited by examiner

*Primary Examiner* — Richard Torrente
(74) *Attorney, Agent, or Firm* — Lorri Anne D. Swanson

(57) ABSTRACT

A caption formatting method and computing system that receives an input video stream that includes a sequence of input transport stream packets. The method locates user data in the sequence of input transport stream packets, where the user data includes input caption data compliant with an input caption data format. The method extracts EIA-608 captions and EIA-708 captions from the input caption data, and formats the EIA-608 captions as caption data compliant with SCTE-20 format. The method creates a sequence of output transport stream packets based on the sequence of input transport stream packets, where the sequence of output transport stream packets include the caption data compliant with SCTE-20 format and the input caption data. The method sends an output video stream from the computing device, where the output video stream includes the sequence of output transport stream packets.

17 Claims, 3 Drawing Sheets

SYSTEM FOR GENERATING CLOSED CAPTIONING COMPATIBLE WITH LEGACY AND NEWER SET-TOP BOXES

BACKGROUND

The Federal Communications Commission (FCC) mandates the technical standards for the display of closed captioning information encoded and transmitted within the television signal. The Advanced Television Systems Committee (ATSC) and the Society of Cable Telecommunications Engineers (SCTE) have defined the technical standards for wrapping closed captioning information within a compressed video signal.

The National Television System Committee (NTSC) developed the closed captioning concepts for analog television signals. The Electronic Industries Alliance (EIA) developed EIA-608 (also known as line 21 captions) as the standard for closed captioning for NTSC television broadcasts in the United States and Canada. The FCC required EIA-608 to be implemented in most television receivers made in the United States.

Digital Television Closed Captioning (DTVCC), formerly known as Advanced Television Closed Captioning (ATVCC), is the migration of NTSC closed captioning to the high-definition digital television environment defined by ATSC. The EIA developed EIA-708 (also known as Consumer Electronics Association CEA-708) as the standard for closed captioning for ATSC digital television streams in the United States and Canada. The FCC requirements specify the use of EIA-708 caption decoders in all 13-inch (33-cm) diagonal or larger digital televisions. Furthermore, the FCC requirements specify that some broadcasters caption a specific percentage of their broadcasts.

The transition from analog to digital television transmissions has made EIA-608 less prevalent as digital televisions replace analog televisions. In addition, legacy cable and satellite set-top boxes implement an older caption transport standard developed by SCTE (SCTE-20) that differs from the broadcast caption transport standard (A/53). Hence, if the broadcast stream is simply retransmitted (or even rate-shaped) over the cable or satellite network, these legacy set-top boxes will not be able to extract and decode broadcast captions. On the other hand, the newer SCTE standard (SCTE-21) is the same as the ATSC standard for captions, and thus newer cable boxes which usually implement SCTE-21 can decode the encapsulated captions. An SCTE-20 wrapper can only carry EIA-608 compliant captions that are defined for analog transmission and display on analog receivers, and an SCTE-21 (A/53) wrapper can carry both EIA-608 and EIA-708 captions, the latter being defined for rendering on newer digital television set-top boxes.

Thus, there is a need for a system and method for caption formatting to ensure that broadcast captions are carried in both legacy and the new formats, such that they are decodable by all cable or satellite receivers. The presently disclosed invention satisfies this demand.

SUMMARY

Aspects of the present invention provide a caption formatting method and computing system that receives an input video stream that includes a sequence of input transport stream packets. The method locates user data in the sequence of input transport stream packets, where the user data includes input caption data compliant with an input caption data format. The method extracts EIA-608 captions and EIA-708 captions from the input caption data, and formats the EIA-608 captions as caption data compliant with SCTE-20 format. The method creates a sequence of output transport stream packets based on the sequence of input transport stream packets, where the sequence of output transport stream packets include the caption data compliant with SCTE-20 format and the input caption data. The method sends an output video stream from the computing device, where the output video stream includes the sequence of output transport stream packets.

DETAILED DESCRIPTION

Figure 1:
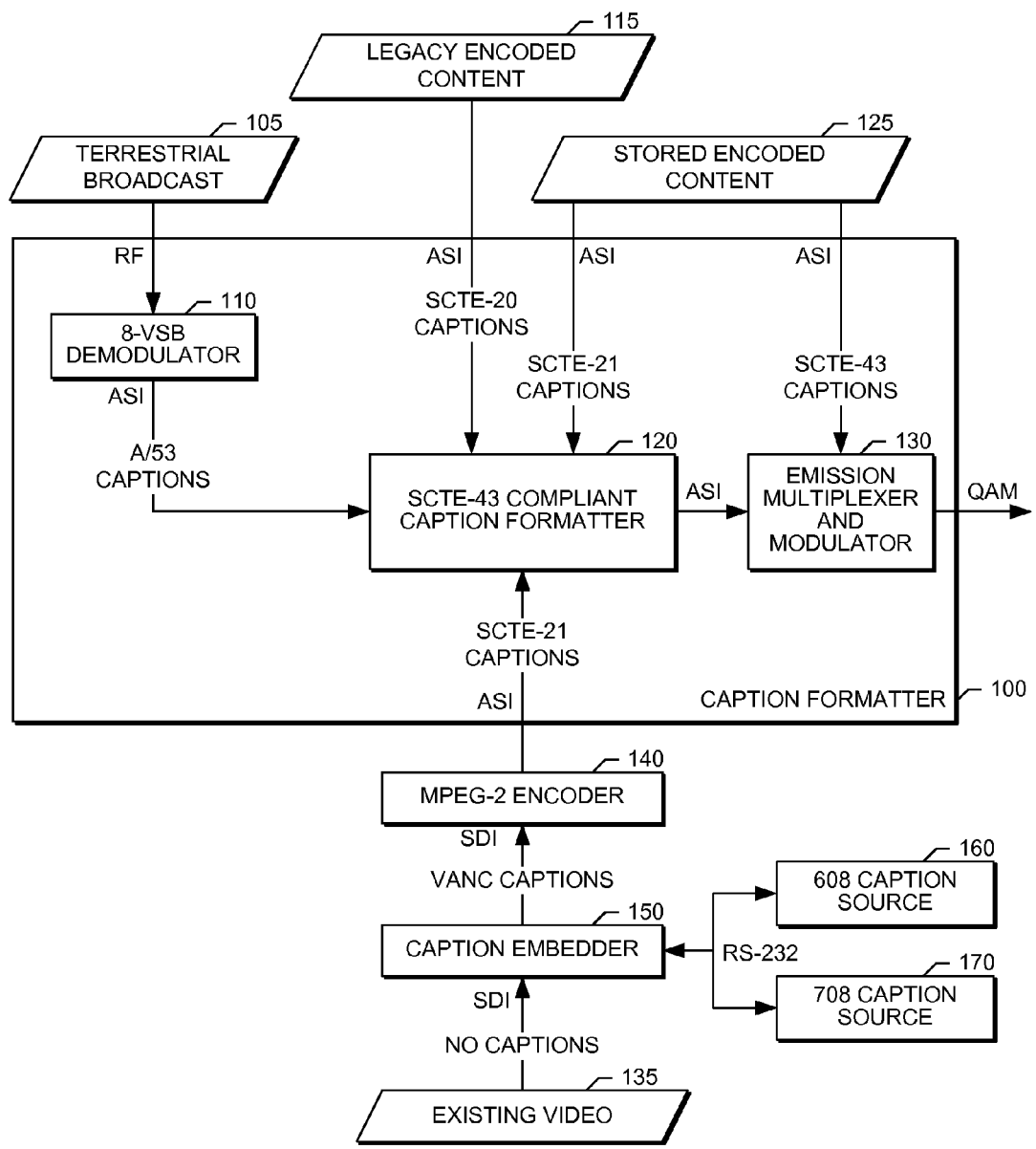
FIG. 1 is a block diagram that illustrates one embodiment of the hardware components of a system that performs the present invention.

FIG. 1 is a block diagram that illustrates one embodiment of the hardware components of a system that performs the present invention. The caption formatter 100 shown in FIG. 1 includes an 8-VSB (vestigial sideband) demodulator 110, SCTE-43 compliant caption formatter 120, and an emission multiplexer and modulator 130.

The 8-VSB demodulator 110 shown in FIG. 1 receives a terrestrial broadcast 105 as an 8VSB RF (radio frequency) television signal and decodes it to a digital video broadcast (DVB) asynchronous serial interface (ASI) output signal for injection into a quadrature amplitude modulation (QAM) modulator. The DVB-ASI output signal of the 8-VSB demodulator 110 includes video with captions in the A/53 format. The A/53 format that is used by broadcasters is identical to the SCTE-21 format for captions.

The SCTE-43 compliant caption formatter 120 shown in FIG. 1 receives video input from four sources. The first source is the terrestrial broadcast 105 RF signal via the 8-VSB demodulator 110. The video signal output from the 8-VSB demodulator 110 is a DVB-ASI video signal with captions in the A/53 format. The second source is legacy encoded content 115 from the legacy cable and satellite set-top boxes. The video signal output from these legacy cable and satellite set-top boxes is an ASI video signal with captions in the SCTE-20 format. The third source is stored encoded content 125 from newer cable and satellite set-top boxes. The video signal output from these newer cable and satellite set-top boxes is an ASI video signal with captions in the SCTE-21 format. The fourth source is from an existing video 135 via an MPEG-2 encoder 140. The existing video 135 signal is a serial digital video interface (SDI) signal with no captions. A caption embedder 150 receives the video signal with no captions and accesses a 608 caption source 160 and a 708 caption source 170 to embed, respectively, EIA-608 and EIA-708 captions in the video signal to produce a video signal with vertical ancillary (VANC) captions. The caption embedder 150 is capable of translating 608 captions to 708 captions if no 708 caption source 170 is present, and creating 608 caption compatibility bytes, before inserting the captions into the VANC captions of the SDI output signal. The caption embedder 150 sends the video with VANC captions as an SDI signal to the MPEG-2 encoder 140. The MPEG-2 encoder 140 sends MPEG-2 video to the SCTE-43 compliant caption formatter 120 as an ASI video signal with captions in the SCTE-21 format.

The emission multiplexer and modulator 130 shown in FIG. 1 receives video input from two sources. The first source is the SCTE-43 compliant caption formatter 120 that sends a video signal to the emission multiplexer and modulator 130 as an ASI video signal with captions in the SCTE-43 format. The second source is stored encoded content 125 from newer cable and satellite set-top boxes. The video signal output from these new cable and satellite set-top boxes is an ASI video signal with captions in the SCTE-43 format.

The SCTE-43 compliant caption formatter 120 and emission multiplexer and modulator 130 perform the following functions. First, the SCTE-43 compliant caption formatter 120 and emission multiplexer and modulator 130 extract and de-embed SCTE-20 formatted EIA-608 captions from video, translate them to EIA-708 captions, format the EIA-708 captions along with EIA-608 compatibility bytes in SCTE-21 format, and re-insert the original SCTE-20 and generated SCTE-21 captions in SCTE-43 format. Second, the SCTE-43 compliant caption formatter 120 and emission multiplexer and modulator 130 extract and de-embed SCTE-21 formatted EIA-608/EIA-708 captions from video, wrap the extracted EIA-608 captions into SCTE-20 format, and reinsert the generated SCTE-20 and original SCTE-21 captions in SCTE-43 format. Third, the SCTE-43 compliant caption formatter 120 and emission multiplexer and modulator 130 multiplex the various sources after formatting/inserting the captions.

The SCTE-43 format defines the format for interleaving SCTE-20 and SCTE-21 wrapped captions. The caption formatter 100 extracts captions from the picture user data of a video stream, such as a broadcast transport stream, and recreates a new stream in which captions are dual-carried in SCTE-20 and SCTE-21 format simultaneously in the picture user data in a SCTE-43 compliant fashion. When the caption formatter 100 receives and demodulates a broadcast stream, the present invention extracts the EIA-608 captions from the A/53 (SCTE-21) wrapper and reinserts the extracted EIA-608 data in SCTE-20 format together with the SCTE-21 formatted captions, such that the SCTE-21 formatted data appears after the SCTE-20 data in the picture user data. The caption formatter 100 performs the reformatting on a per frame basis, and in real-time.

The caption formatter 100 is efficient, and able to perform the reformatting in real-time, because it makes use of the constraint that picture user data in which caption wrappers are present has to occur before a picture header and after a PES header. The SCTE/ATSC standards and specifications describe that every video PES packet starts in a new transport stream packet on which the payload unit start indicator is set to 1. Thus, the caption formatter 100 does not process every transport packet, but rather a much smaller subset of the total number of packets. This significantly reduces the computational load on the caption formatter 100. Furthermore, since a broadcast stream cannot be encrypted, the caption formatter 100 has no overhead for decrypting before reformatting the captions.

Figure 2:
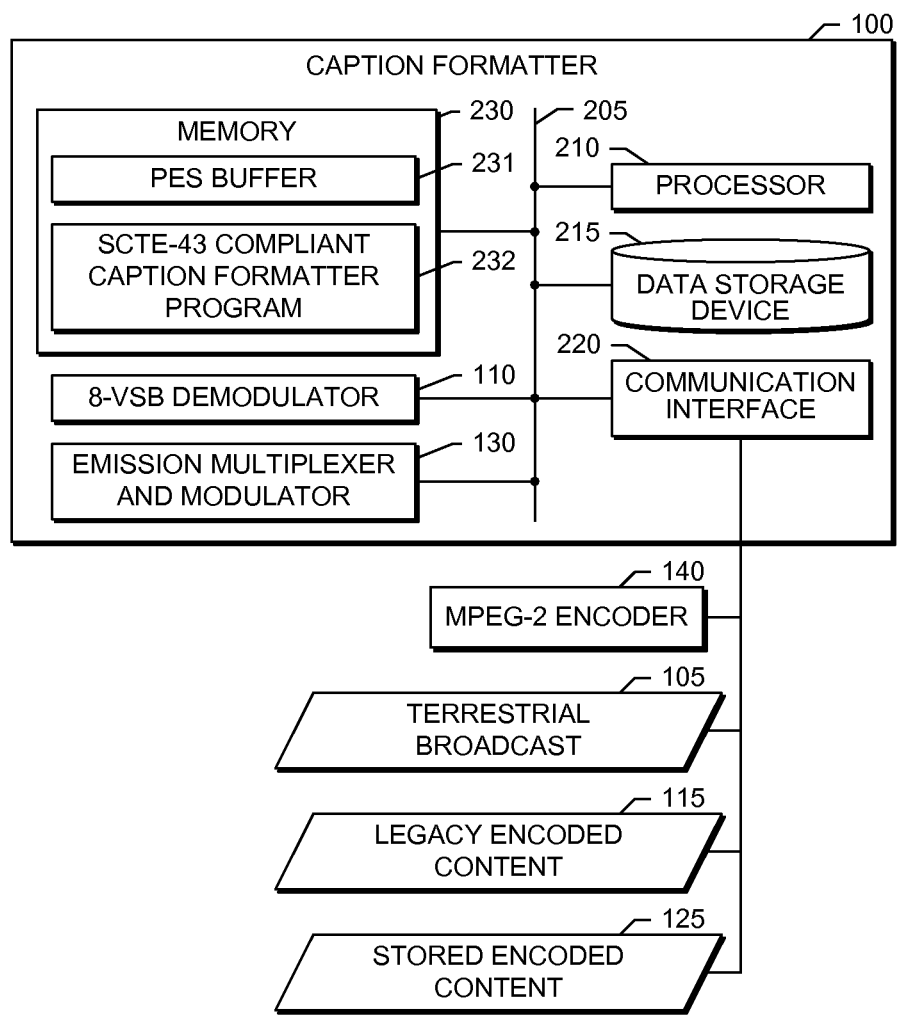
FIG. 2 is a block diagram that illustrates, in detail, one embodiment of the hardware components shown in FIG. 1.

FIG. 2 is a block diagram that illustrates one embodiment of the hardware components shown in FIG. 1. In particular, FIG. 2 illustrates the hardware components and software comprising the caption formatter 100 shown in FIG. 1.

The caption formatter 100 shown in FIG. 2, in one embodiment, is a general-purpose computing device that performs the present invention. A bus 205 is a communication medium that connects a processor 210, data storage device 215 (such as a Serial ATA (SATA) hard disk drive, optical drive, Small Computer System Interface (SCSI) disk, or the like), communication interface 220, memory 230 (such as Random Access Memory (RAM), Dynamic RAM (DRAM), non-volatile computer memory, flash drive, or the like), 8-VSB demodulator 110, and emission multiplexer and modulator 130. The communication interface 220 receives a video stream from the MPEG-2 encoder 140, terrestrial broadcast 105, legacy encoded content 115, and stored encoded content 125.

The processor 210 performs the disclosed methods by executing the sequences of operational instructions that comprise each computer program resident in, or operative on, the memory 230. The reader should understand that the memory 230 may include operating system, administrative, and database programs that support the programs disclosed in this application. In one embodiment, the configuration of the memory 230 of the caption formatter 100 includes a packetized elementary stream (PES) buffer 231, and a SCTE-43 compliant caption formatter program 232. The PES buffer 231, and SCTE-43 compliant caption formatter program 232 perform the methods of the present invention disclosed in detail in FIG. 3. When the processor 210 performs the disclosed methods, it stores intermediate results in the memory 230 or data storage device 215. In another embodiment, the memory 230 may swap these programs, or portions thereof, in and out of the memory 230 as needed, and thus may include fewer than all of these programs at any one time.

Figure 3:
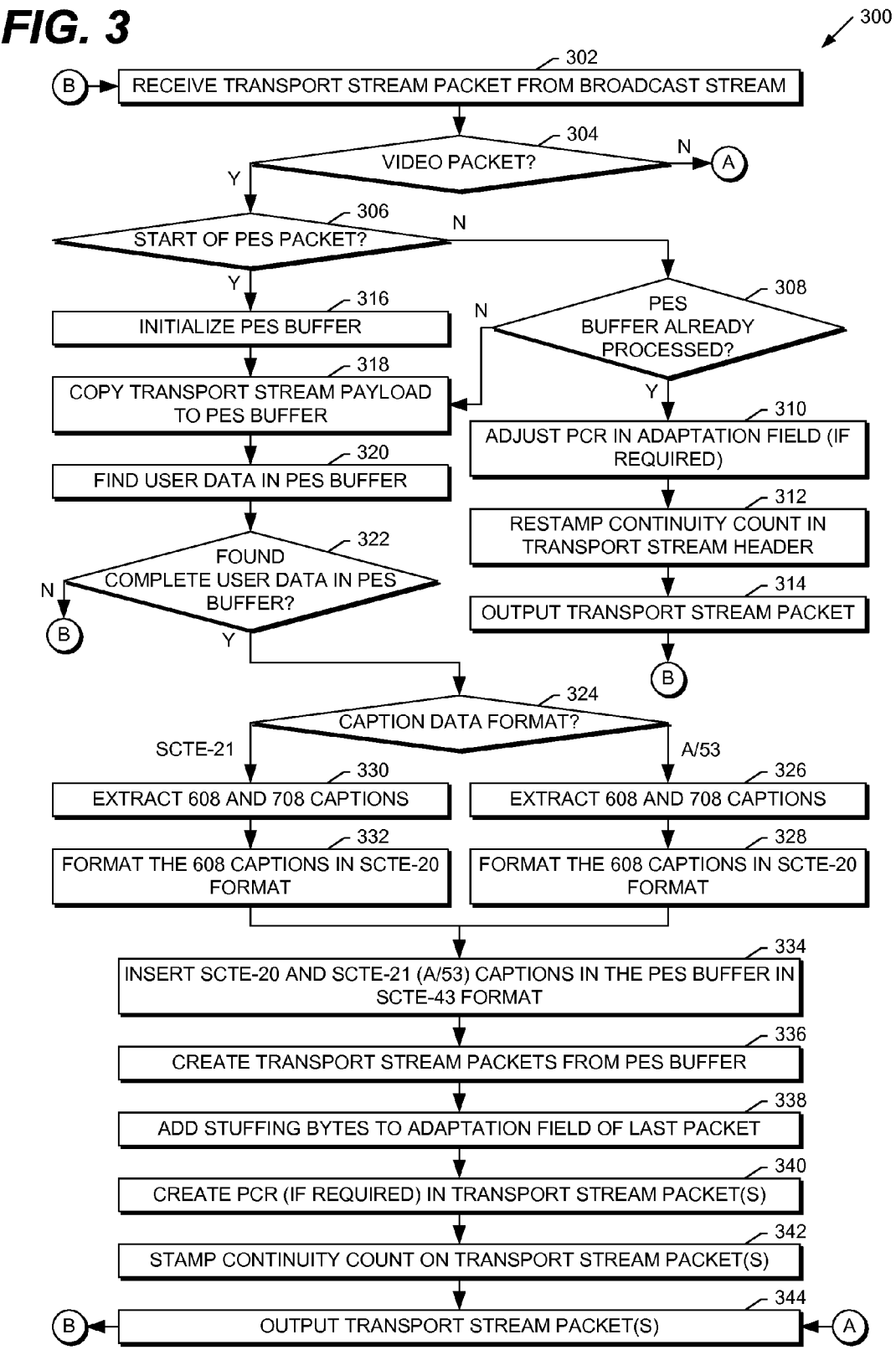
FIG. 3 is a flow chart that illustrates a method for caption formatting according to an embodiment of the present invention.

FIG. 3 is a flow chart that illustrates a method for caption formatting according to an embodiment of the present invention. In particular, FIG. 3, with reference to FIG. 1 and FIG. 2, illustrates a device to ensure that broadcast captions are carried in both legacy and the new formats, such that they are decodable by all cable or satellite receivers.

The process 300 shown in FIG. 3 begins when the caption formatter 100 receives a transport stream packet from a broadcast stream (step 302). In one embodiment, the broadcast stream is an MPEG-2 video stream. In another embodiment, when the video stream is a terrestrial broadcast 105, the 8-VSB demodulator 110 receives the terrestrial broadcast 105 and produces a video stream with captions in the A/53 format. In yet another embodiment, when the video stream is legacy encoded content 115, the SCTE-43 compliant caption formatter 120 receives the legacy encoded content 115 as a video steam with captions in the SCTE-20 format. In yet another embodiment, when the video stream is stored encoded content 125, the SCTE-43 compliant caption formatter 120 receives the stored encoded content 125 as a video stream with captions in SCTE-21 format. In yet another embodiment, when the video stream is stored encoded content 125, the emission multiplexer and modulator 130 receives the stored encoded content 125 as a video stream with captions in SCTE-43 format. In yet another embodiment, when the video stream is existing video 135, the SCTE-43 compliant caption formatter 120 receives a video stream with captions in SCTE-21 format after the existing video 135 is processed by the caption embedder 150 and the MPEG-2 encoder 140; where the caption embedder 150 inserts EIA-608 captions or EIA-708 captions by accessing either a 608 caption source 160 or a 708 caption source 170. After receiving the transport stream packet (step 302), the process 300 determines whether this packet is a video packet (step 304). If this is not a video packet (step 304, N branch), the SCTE-43 compliant caption formatter 120 outputs the transport stream packets (step 344), and receives the next transport stream packet from the broadcast stream (step 302). If this is a video packet (step 304, Y branch), the SCTE-43 compliant caption formatter 120 determines whether this packet is the first packet of a packetized elementary stream (PES) (step 306).

If this is first packet of a PES (step 306, Y branch), the SCTE-43 compliant caption formatter 120 initializes the PES buffer (step 316), copies the transport stream payload to a PES buffer (step 318), and finds the user data in the PES buffer (step 320). If the PES buffer does not include complete user data (step 322, N branch), the SCTE-43 compliant caption formatter 120 receives the next transport stream packet from the video stream (step 302). If the PES buffer includes complete user data (step 322, Y branch), the SCTE-43 compliant caption formatter 120 determines the caption data format (step 324). When the caption data format is A/53 (step 324, A/53 branch), the SCTE-43 compliant caption formatter 120 extracts EIA-608 captions (step 326), formats the EIA-608 captions in SCTE-20 format (step 328), and inserts the SCTE-20 and SCTE-21 (A/53) format captions in the PES buffer in SCTE-43 format (step 334). When the caption data format is SCTE-21 (step 324, SCTE-21 branch), the SCTE-43 compliant caption formatter 120 extracts EIA-608 and EIA-708 captions (step 330), formats the EIA-608 captions in SCTE-20 format (step 332), and inserts the SCTE-20 and SCTE-21 (A/53) format captions in the PES buffer in SCTE-43 format (step 334). The SCTE-43 compliant caption formatter 120 creates transport stream packets from the PES buffer (step 336), adds stuffing bytes to the adaptation field of the last packet (step 338), creates a program clock reference (PCR), if required, in the transport stream packet(s) (step 340), stamps the continuity count on the transport stream packet(s) (step 342), and outputs the transport stream packet (s) (step 344). The SCTE-43 compliant caption formatter 120 then receives the next transport stream packet from the broadcast stream (step 302).

If this is not the first packet of a PES (step 306, N branch), the SCTE-43 compliant caption formatter 120 determines whether the PES buffer has already been processed (step 308). If the PES buffer has not been processed (step 308, N branch), the SCTE-43 compliant caption formatter 120 copies the transport stream payload to the PES buffer (step 318), and the process 300 continues as described above. If the PES buffer has been processed (step 308, Y branch), the SCTE-43 compliant caption formatter 120 adjusts the PCR, if required, in the adaptation field (step 310), restamps the continuity count in transport stream header (step 312), and outputs the transport stream packet (step 314). The SCTE-43 compliant caption formatter 120 then receives the next transport stream packet from the broadcast stream (step 302).

Although the disclosed embodiments describe a fully functioning method for caption formatting in a computing device, the reader should understand that other equivalent embodiments exist. Since numerous modifications and variations will occur to those reviewing this disclosure, the method for caption formatting in a computing device is not limited to the exact construction and operation illustrated and disclosed. Accordingly, this disclosure intends all suitable modifications and equivalents to fall within the scope of the claims.

We claim:

1. A method, comprising:
   receiving an input video stream at a computing device, the input video stream comprising an MPEG-2 transport stream including a sequence of input transport stream packets;
   locating user data in the sequence of input transport stream packets, the user data including input caption data compliant with an input caption data format, wherein the input caption data format comprises at least one of SCTE-21 format or A/53 format;
   extracting EIA-608 captions and EIA-708 captions from the input caption data;
   formatting the EIA-608 captions as caption data compliant with SCTE-20 format;
   creating a sequence of output transport stream packets based on the sequence of input transport stream packets, wherein the sequence of output transport stream packets include the caption data compliant with SCTE-20 format and the input caption data; and
   sending an output video stream from the computing device, the output video stream including the sequence of output transport stream packets.

2. The method of claim 1, wherein the input video stream is a digital television stream.

3. The method of claim 1, wherein the user data is located in a packetized elementary stream (PES) packet of the sequence of input transport stream packets.

4. The method of claim 3, further comprising:
   storing the PES packet in a PES buffer.

5. The method of claim 1, wherein the creating of the sequence of output transport stream packets further comprises:
   formatting the caption data compliant with SCTE-20 format and the input caption data as caption data compliant with SCTE-43 format.

6. The method of claim 1, wherein the creating of the sequence of output transport stream packets further comprises:
   adding stuffing bytes to an adaptation field of the last packet in the sequence of output transport stream packets.

7. The method of claim 1, wherein the creating of the sequence of output transport stream packets further comprises:
   creating a PCR in the sequence of output transport stream packets; and
   stamping a continuity count on the sequence of output transport stream packets.

8. A non-transitory computer-readable medium, comprising computer-executable instructions that, when executed on a computing device, perform the method of claim 1.

9. The method of claim 1, wherein:
   the input video stream is received by the computing device at a first asynchronous serial interface (ASI) of the computing device; and
   the output video stream is sent from the computing device via a second ASI of the computing device.

10. A computing system, comprising:
    a memory device resident in the computing system; and
    a processor disposed in communication with the memory device, the processor configured to:
      receive an input video stream, the input video stream comprising an MPEG-2 transport stream including a sequence of input transport stream packets;
      locate user data in the sequence of input transport stream packets, the user data including input caption data compliant with an input caption data format, wherein the input caption data format comprises at least one of SCTE-21 format or A/53 format;
      extract EIA-608 captions and EIA-708 caption from the input caption data;
      format the EIA-608 captions as caption data compliant with SCTE-20 format;
      create a sequence of output transport stream packets based on the sequence of input transport stream packets, wherein the sequence of output transport stream packets include the caption data compliant with SCTE-20 format and the input caption data; and send an output video stream from the computing device, the output video stream including the sequence of output transport stream packets.

11. The computing system of claim 10, wherein the input video stream is a digital television stream.

12. The computing system of claim 10, wherein the user data is located in a packetized elementary stream (PES) packet of the sequence of input transport stream packets.

13. The computing system of claim 12, wherein the processor is further configured to:
store the PES packet in a PES buffer.

14. The computing system of claim 10, wherein to create the sequence of output transport stream packets the processor is further configured to:
format the caption data compliant with SCTE-20 format and the input caption data as caption data compliant with SCTE-43 format.

15. The computing system of claim 10, wherein to create the sequence of output transport stream packets the processor is further configured to:
add stuffing bytes to an adaptation field of the last packet in the sequence of output transport stream packets.

16. The computing system of claim 10, wherein to create the sequence of output transport stream packets the processor is further configured to:
create a PCR in the sequence of output transport stream packets; and
stamp a continuity count on the sequence of output transport stream packets.

17. The computing system of claim 10, further comprising:
a first asynchronous serial interface (ASI) in communication with the processor, wherein the input video stream is received by the processor from the first ASI; and
a second ASI in communication with the processor, wherein the output video stream is sent by the processor to the second ASI.

* * * * *